Jan. 31, 1967  R. W. COURSEY  3,301,413
HIGH SPEED HIGH CAPACITY MECHANICAL PARKING SYSTEM
Filed April 10, 1964  7 Sheets-Sheet 4
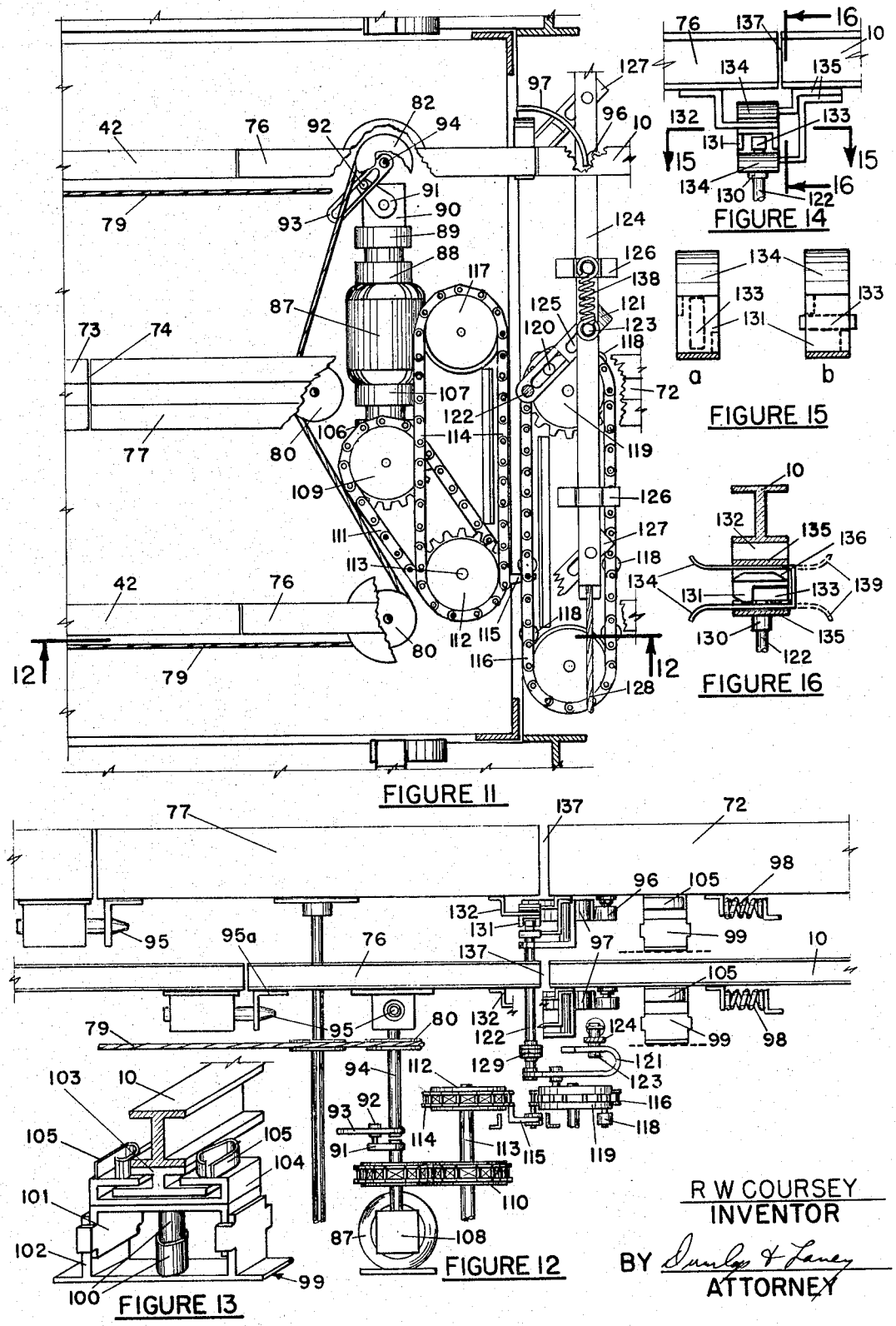
R W COURSEY
INVENTOR
BY *Dunlap & Laney*
ATTORNEY

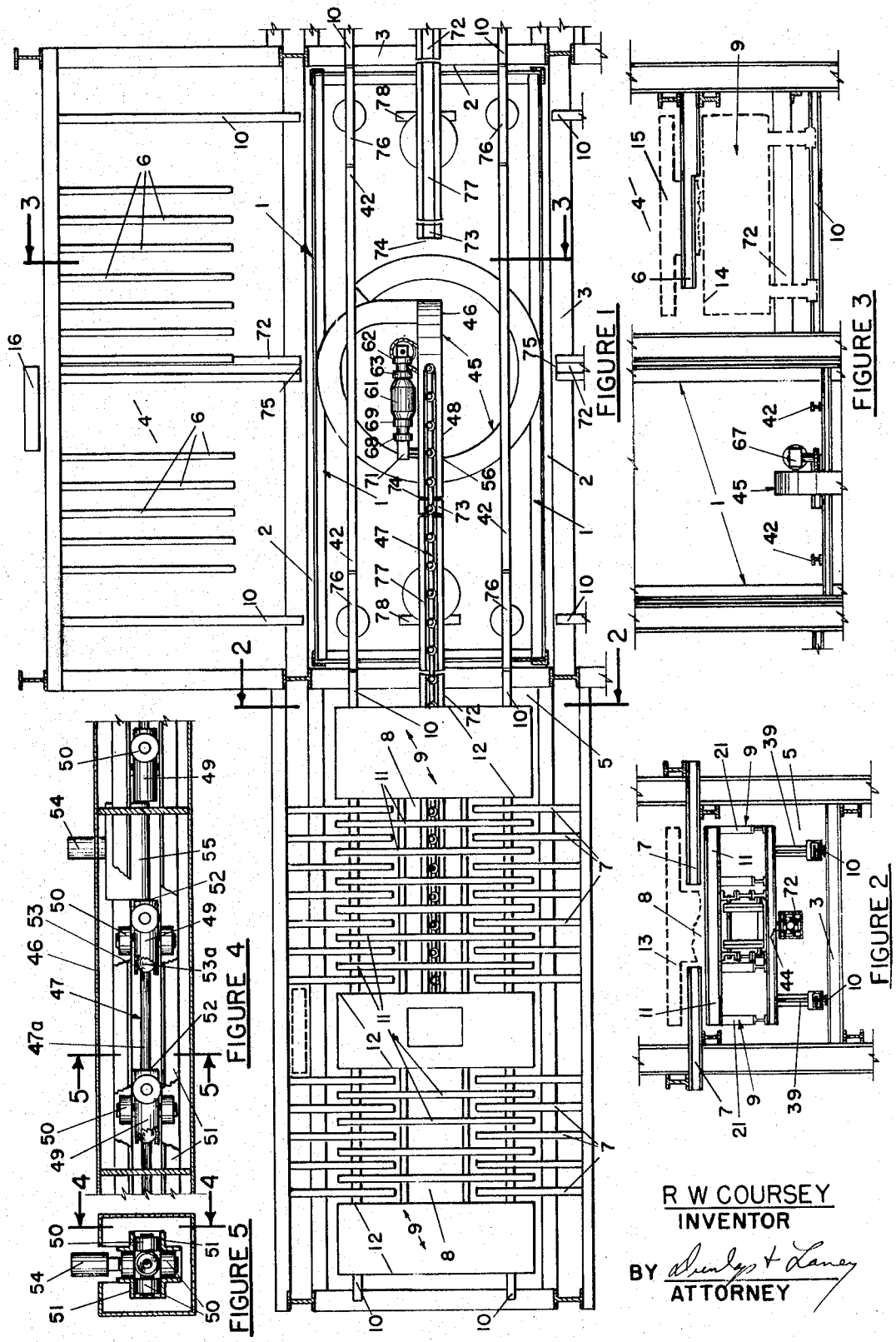

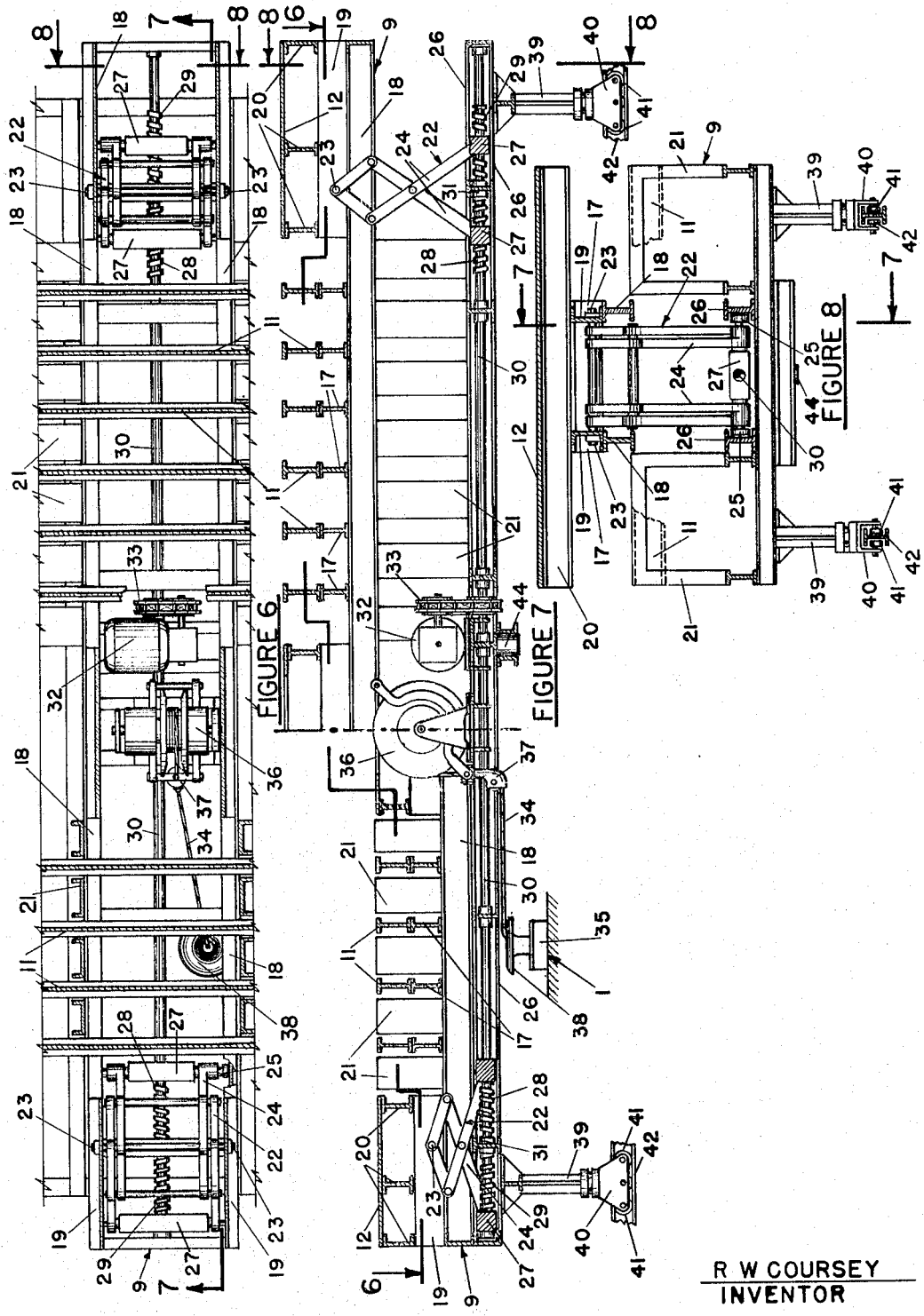

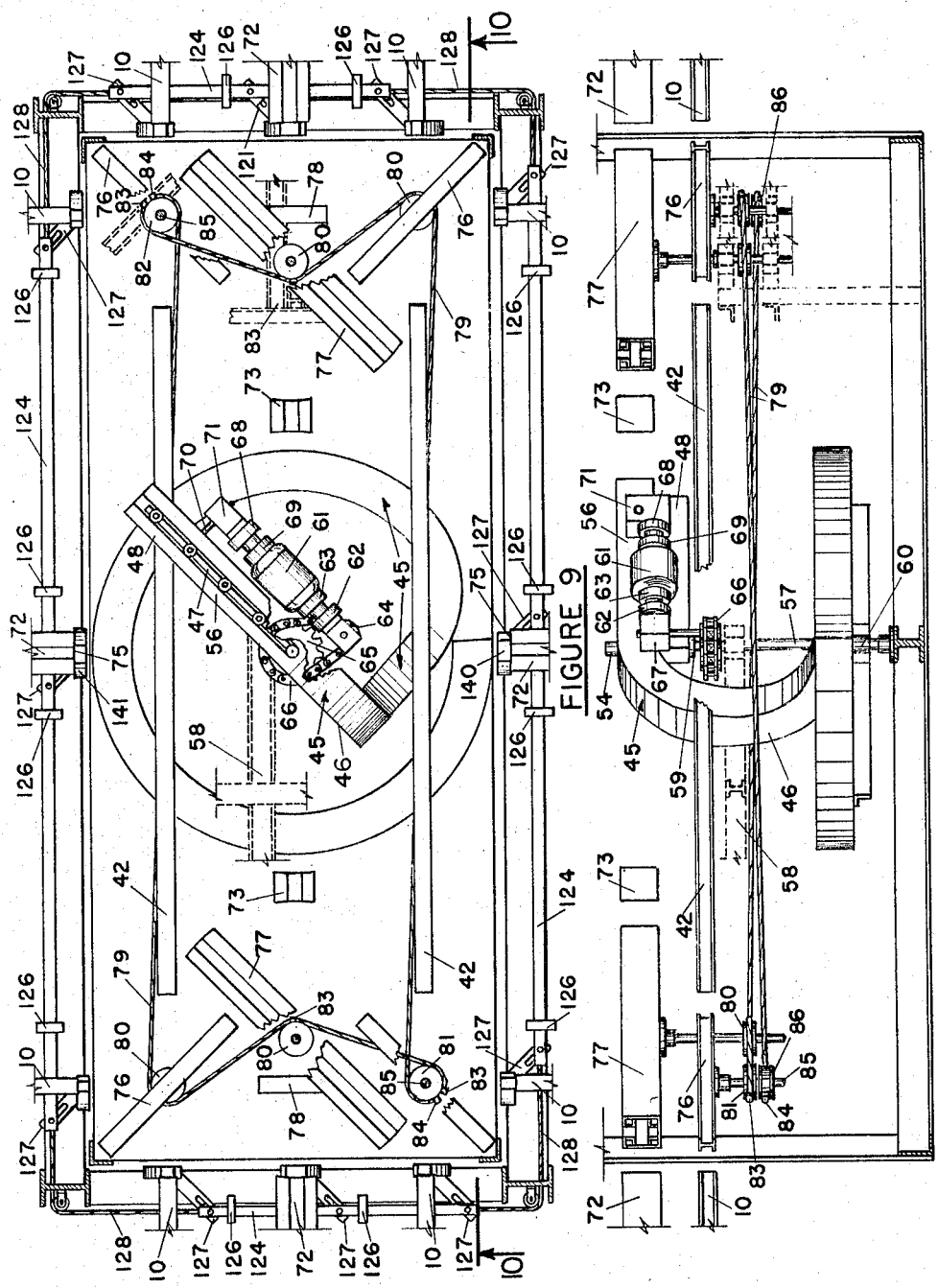

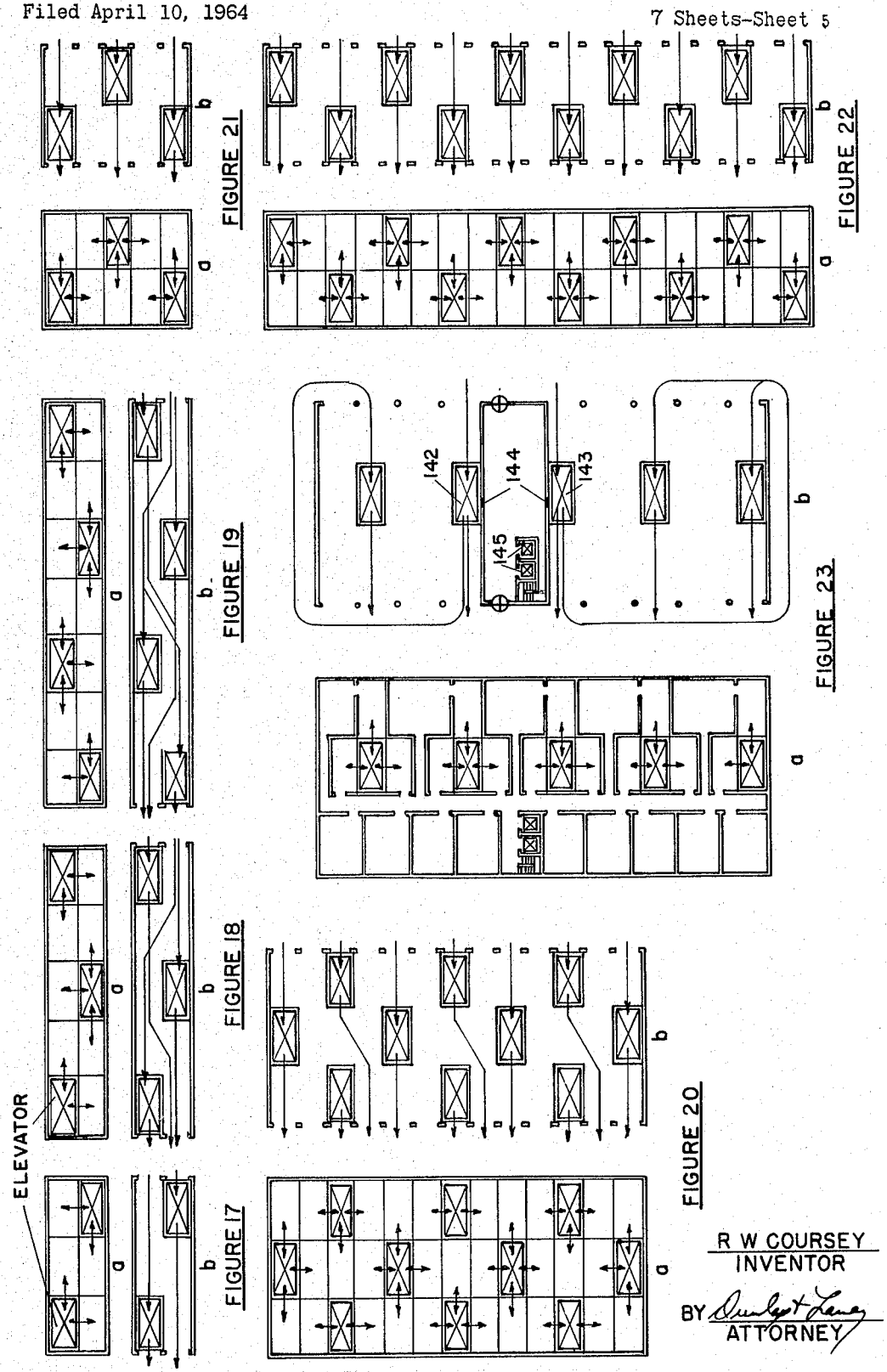

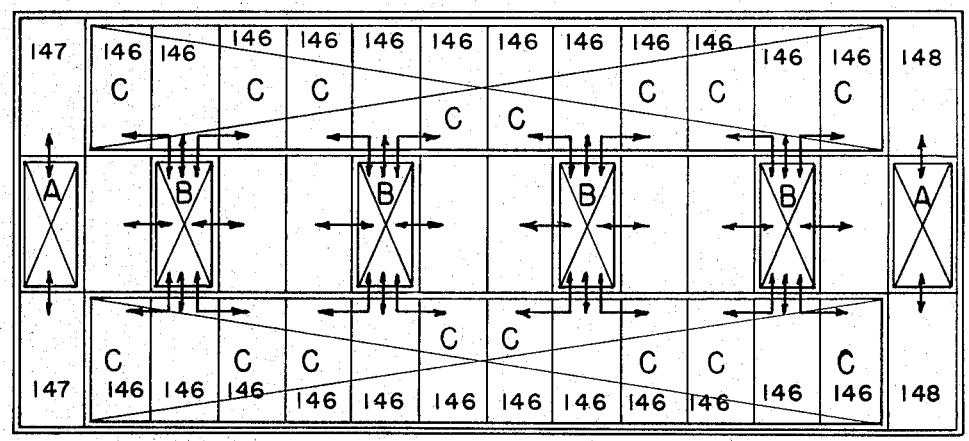
FIGURE 24
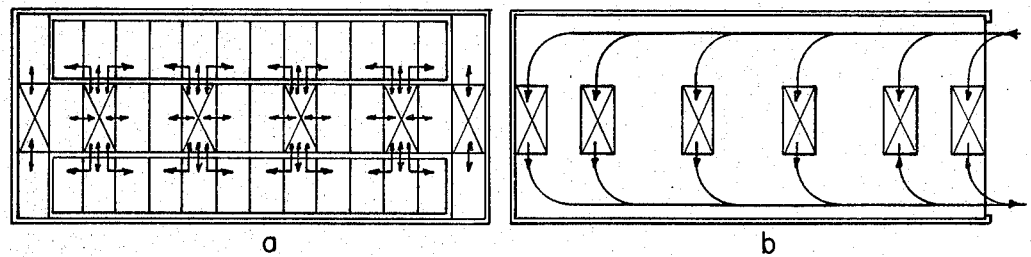
a     FIGURE 25     b
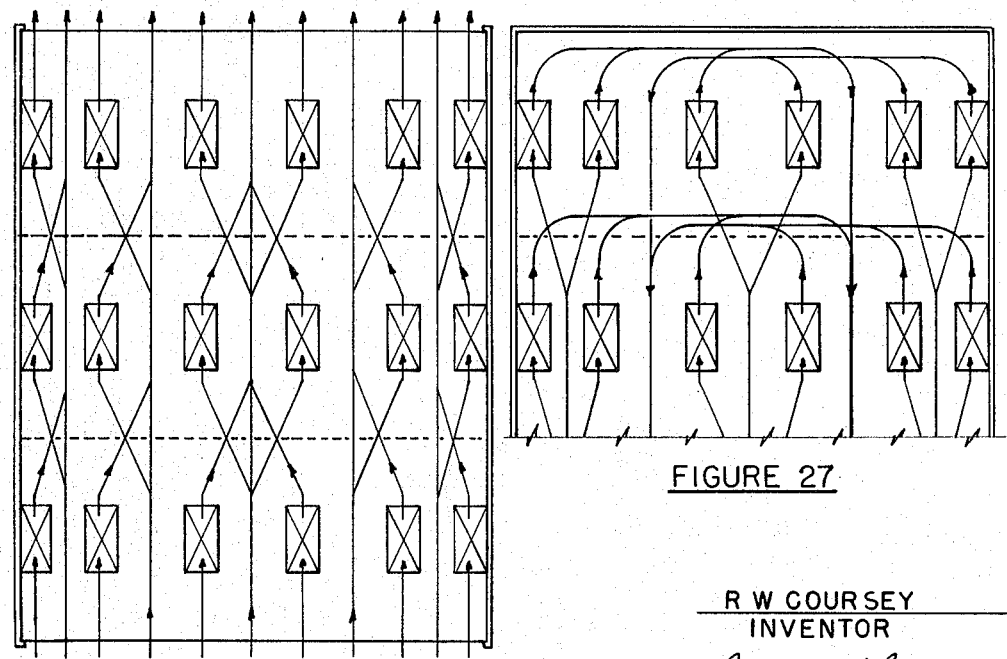
FIGURE 26
FIGURE 27

United States Patent Office 3,301,413
Patented Jan. 31, 1967

3,301,413
HIGH SPEED HIGH CAPACITY MECHANICAL
PARKING SYSTEM
Ralph W. Coursey, 1414 E. Wilshire,
Oklahoma City, Okla. 73116
Filed Apr. 10, 1964, Ser. No. 358,834
4 Claims. (Cl. 214—16.1)

This invention in general relates to an improved method and system for storing objects and is particularly suited for mechanically parking automobiles at a high percent occupancy in a multi-level elevator type garage. The title of the system indicates that the system is designed for high speed, mass parking of vehicles.

The 1963 edition of "Automobile Facts and Figures," published by the Automobile Manufacturers Association shows that there were 63,011,566 passenger automobile registrations in 1961 compared to 42,525,217 in 1951. This is an increase of 20,486,349 in ten years or 2,048,635 per year. A review of the publication "Parking Guide for Cities" prepared by the U.S. Department of Commerce indicates that parking spaces are not keeping pace with the demand and furthermore that the ones being operated are not in the right location which would be in the central business districts. This is the area of high land values and where the only automobile parking systems that are practical are the high occupancy parking systems. This requirement can only be satisfied by systems that can mass park automobiles, where they are stored in very close proximity. Isles and turning spaces must be eliminated and a system devised to permit selective removal of the automobiles. Because of the requirements of close spacing, speed of selective extraction and minimum land area, the only practical parking systems for central business areas are the mechanical, multi-level garages.

While there have been many inventions of mechanical systems patented, the only types in general use today utilize approximately one-third or more of the total floor area for the elevator systems. This arrangement results in only 67% or less of the total floor area being usable for parking automobiles.

Systems presently in use store automobiles on only two sides of an elevator. In this case the several elevators must be immediately adjacent or must travel laterally in shaft space unusable for parking. My system will store automobiles on four sides of an elevator and will in one design store them in the corner positions to fill out a rectangular configuration. In this case the one car space elevator operating in a single shaft will store and unstore from eight storage cells. It is a true mass parking system in that exclusive of the one car size elevator shaft, the space occupancy is always 100 percent. When the elevator space is included the floor area usable for storage in my system can be as high as 87 percent of the total floor area. This is 75 more automobiles than can be stored in a conventional 250 automobile system with a 67 percent occupancy rate.

The principal feature of this invention is the application of a new and improved method of transferring automobiles between any or all four sides of an elevator and storage cells. These storage cells can be fixed, as part of the building structure, or moved parallel to the elevator sides to permit several storage cells to be available to one elevator.

The basic principle of operation is the movement of a dolly longitudinally or laterally from the elevator to park or unpark an automobile in or from a storage cell and return to the elevator. The dolly is permanently attached and associated with the elevator. The top of the dolly, on which an automobile can rest, is made up of extended fingers which can be raised or lowered from control facilities located on the elevator. The parking cells also have extended fingers arranged so that when the dolly has been moved beneath them its fingers, as the platform is raised or lowered, will pass in mesh through the storage cell fingers. In parking an automobile the dolly platform is in the raised position as it leaves the elevator and when the dolly has been moved into the storage cell the platform is lowered transferring the automobile to the fingers of the parking cell. The dolly is then retrieved by the elevator.

An important object of this system is to provide a mechanical storage system in which the unusable storage space, usually elevators and elevator shafts, is reduced to a minimum thus permitting maximum ratio of storage area to total area.

Another object of this invention is to provide a storage system that requires the least amount of time for the storing and unstoring operations.

A further object of this invention is to provide a storage system where the number of storage levels does not materially affect the speed or efficiency of its operation.

Another object of this invention is to provide a storage system where objects are stored in a relatively fixed location thus simplifying the controls necessary to automatize the operation.

A further object of this invention is to provide a storage system where a high percentage of the mechanical facilities and cost pertinent to its operation are located on the elevator proper which is a common facility to all the storage spaces and floor levels thus greatly reducing the cost to that of a single set of facilities for each system rather than a multiplicity of facilities associated with each floor or storage space.

Another object of this invention is to provide a storage system that is flexible in configuration and flexible in number of storage space design. Also one that is expandable laterally, longitudinally and vertically as the storage load increases.

Another object of this invention is to provide a storage system that obtains maximum efficiency in rectangular configuration, the usual shape of land parcels.

A still further object of this invention is to provide a storage system that when used for parking automobiles permits traffic patterns that provide efficient loading and unloading of vehicles at the street level.

In the drawings:
FIGURE 1 is a plan view of an elevator carriage, an end and side storage cell and a parking dolly in end storage cell position.
FIGURE 2 is a sectional view taken through an end storage cell along lines 2—2 of FIGURE 1.
FIGURE 3 is a sectional view taken through a side storage cell along line 3—3 of FIGURE 1.
FIGURE 4 is a sectional plan of the conveyor chain and conveyor track system used to drive a dolly to and from the elevator.
FIGURE 5 is a sectional view taken through FIGURE 4 along lines 5—5.
FIGURE 6 is a sectional plan of an elevator dolly.
FIGURE 7 is a sectional view taken through either FIGURE 6 or FIGURE 8 along lines 7—7.
FIGURE 8 is a sectional view taken through either FIGURE 6 or FIGURE 7 along lines 8—8.
FIGURE 9 is a plan view of an elevator carriage illustrating its parking mechanism.
FIGURE 10 is a sectional view taken through FIGURE 9 along lines 10—10.
FIGURE 11 is a plan view of an elevator carriage turn table operator and the track latch operator.
FIGURE 12 is a sectional view taken through FIGURE 11 along lines 12—12.

FIGURE 13 is an isometric illustration of a special track support which permits adjustment of storage cell track ends to facilitate alignment with elevator tracks.

FIGURE 14 is a detail elevation of the track latching mechanism used to latch elevator tracks to the tracks at the floor levels.

FIGURES 15(a) and 15(b) are sectional views taken through FIGURE 14 along lines 15—15. FIGURE 15(a) shows the open position and FIGURE 15(b) shows the closed position of the latch.

FIGURE 16 is a sectional view taken through FIGURE 14 along lines 16—16.

FIGURE 17(a) is a diagrammatic plan view of an upper floor of the storage system utilizing two two-way park elevators and FIGURE 17(b) shows the plan of the street floor traffic handling arrangement for the same system.

FIGURES 18(a) and 18(b) are diagrammatic plan views of an upper and street floor arrangement of a three-elevator system.

FIGURE 19 is the same as FIGURES 17 and 18 except that it illustrates a four-elevator system.

FIGURE 20 is a diagrammatic view of upper and street floor levels of a ten-elevator system.

FIGURE 21 and FIGURE 22 are other arrangements.

FIGURE 23 is a diagrammatic view of an upper level and street floor system arrangement for a motel, office building or apartment and permits parking adjacent to rooms.

FIGURE 24 is a diagrammatic view of a maximum occupancy system that utilizes movable storage cells permitting one elevator to store or unstore from as many as eight storage cells.

FIGURE 25(a) is a diagrammatic view of a six-elevator system of the movable storage cell type and FIGURE 25(b) shows the street floor arranged for one end street entrance and exit.

FIGURE 26 is a street floor, through traffic type, arrangement utilizing 18 or more elevators.

FIGURE 27 is the same as FIGURE 26 except that it is a single street entrance and exit arrangement.

Figure 28:
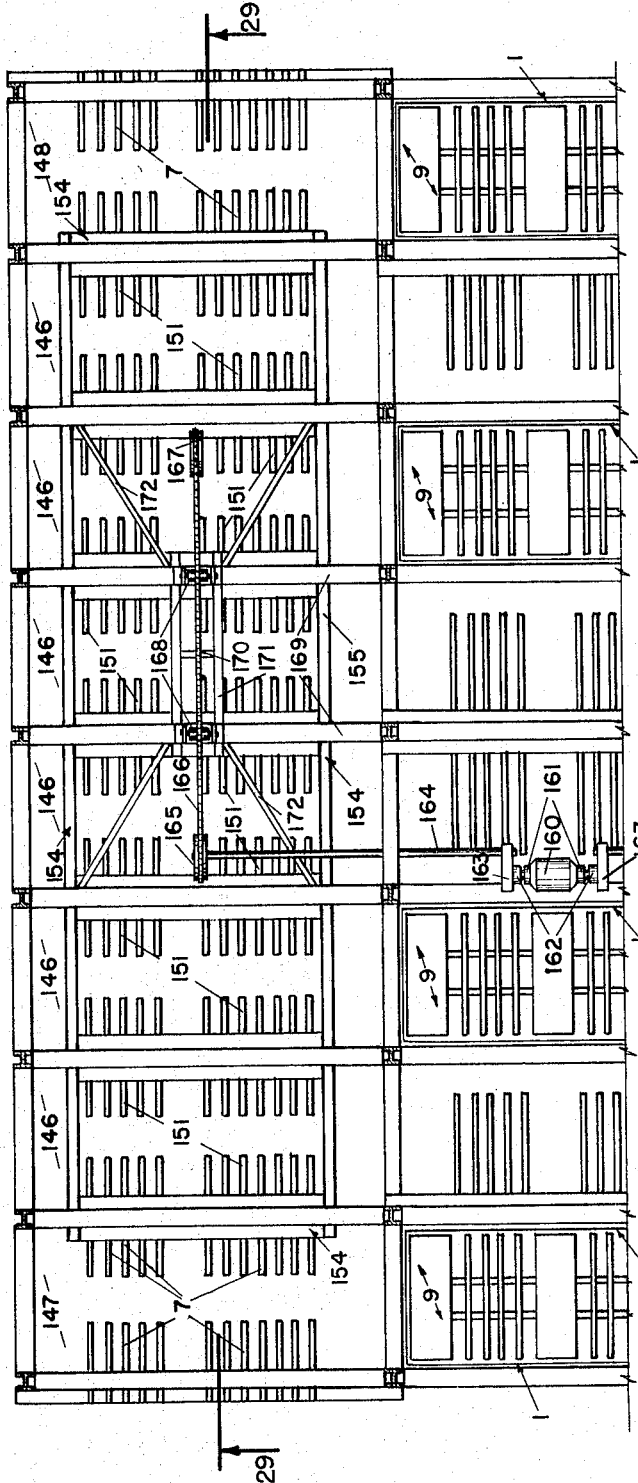

FIGURE 28 is a plan view of an upper floor level of a movable storage cell type of garage illustrating details of its operation.

Figure 29:
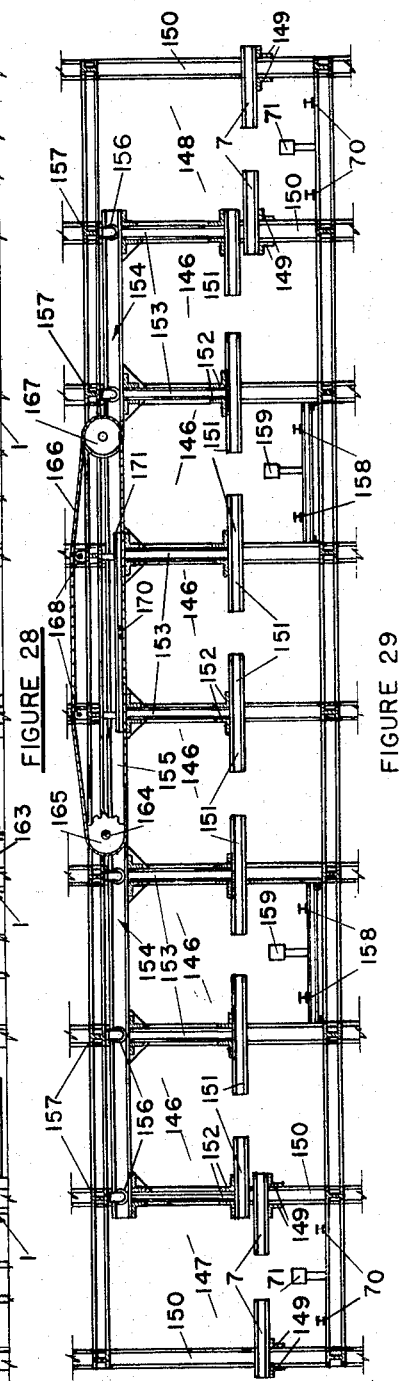

FIGURE 29 is a sectional view taken through FIGURE 28 along lines 29—29.

GENERAL

Referring to the drawings in detail and starting with FIGURES 1, 2, 3 and 4. The elevator carriage 1 in shaft 2 has been lifted to a storage floor level 3. The building bay shown at the top right of FIGURE 1 is a side storage cell 4. In the bay adjacent and to the left of the elevator shaft 2 is shown an end storage cell 5. There can be another storage cell at the oposite end and opposite side of the elevator shaft 2. Both the side storage cells 4 and the end storage cells 5 have load supporting fingers 6, in the side storage cells and 7 in the end storage cells. It will be noted that the spacing of the fingers 6 and 7 in cells 4 and 5 are identical but there is a difference in finger length and configuration in that in the side storage cell 4 the fingers 6 extend from one side of the bay oposite the elevator shaft 2 towards the elevator shaft 2 and stop just short of the elevator. In the end storage cell 5 the fingers 7 extend from both sides of the bay toward the middle allowing a longitudinal isle 8 between the two rows of fingers. The purpose of the two arrangements can be understood by reference to FIGURES 2 and 3, sections taken through the two storage cells. In FIGURES 1 and 2 dolly 9 is shown in the end storage cell 5 having been moved along tracks 10 to storage cell 5. FIGURE 1 shows that dolly fingers 11 and cover plates 12 are matched with end storage cell fingers 7 in such maner that the dolly fingers 11 can be raised or lowered past the storage cell fingers 7 without interference. In FIGURE 2 the dolly fingers 11 are shown in a lowered position. The position taken by dolly fingers 11 when in a raised position are shown by the dashed outline 13. In this position it can be seen that the dolly 9 can be moved along the isle 8 on tracks 10 towards its home position on the elevator 1. It can also be moved to the elevator without interference when the dolly fingers 11 are in the lowered position.

Remembering that the fingers 6 in the side storage cell 4 are spaced identically as in end cell 5 and referring to FIGURE 3, a cross section of end storage cell 5, it can be seen that were the dolly 9 moved laterally from the elevator 1 into this cell its fingers 11 could be raised or lowered past the side storage cell fingers 6 without interference. The dashed outline 14 is of the dolly with fingers 11 lowered and the outline 15 with fingers 11 raised. Furthermore it can be seen from FIGURE 3 that the dolly 9 can be moved laterally to or from the side storage cell 4 with fingers 11 in the raised position 15 or lowered position 14 without interference.

It thus can be seen that with a laterally or longitudinally moveable dolly 9 and a means of moving it to be described later, vehicles can be moved from the elevator 1 on raised dolly fingers 11 to any one of 4 possible storage cells, side cell 4 and end cell 5 being ones shown, then fingers 11 can be lowered depositing the vehicle on the storage cell fingers 6 or 7 as the case may be, and the empty dolly 9 returned to the elevator 1. Note that elevator counterweight 16 is located so as not to interfere with the transfer.

The load supporting fingers 6 and 7 in the storage cells 4 and 5 are in two clusters with space between and at the ends of the clusters. This cluster arrangement of supporting fingers will accommodate the tires of all automobiles regardless of wheel base. Additional fingers are unnecessary since automobiles will be moved vertically on and off of the fingers 6 and 7, always at approximately the same position.

TRANSFER DOLLY

The dolly 9 is shown in detail plan on FIGURE 6. FIGURES 7 and 8 are sections taken of FIGURE 6. FIGURE 7 is shown with the left half in lowered position and right half in raised position. The plan shown in FIGURE 6 is a sectional plan taken along lines 6—6 of FIGURE 7. To see the top plan refer to FIGURE 1 showing the dolly 9 in end storage cell 5. In FIGURE 7 dolly fingers 11 are shown on top of and supported by ten short members 17. The length of the fingers 11 and the short members 17 are shown in FIGURE 8. The short members 17 furnish additional finger depth shown necessary in FIGURE 3 to permit the dolly fingers 11 (shown dashed 14 in FIGURE 3) to be raised sufficiently high to clear the storage cell fingers 6. The members 17 are short to permit passage along the isle 8 between end storage cell fingers 7 shown in FIGURE 2, when dolly fingers 11 are in raised position (shown in dashed outline 13 on FIGURE 2). The short members 17 are supported by two vertically movable longitudinal members 18. At each end of longitudinal members 18 are short longitudinal members 19 which in turn support cross members 20 which are the same length as the load supporting fingers 11. These members 20 are not termed fingers since they do not mesh with storage cell fingers 4 and 5 as shown in FIGURE 1 but are covered with plates 12. When the vertically movable section, all parts supported by members 18, is in the lowered position the tops of inverted-U shaped vehicle supporting members 21, which may be channel iron, are flush with the tops of dolly fingers 11 as shown by the dashed outline in FIGURE 8. This permits automobiles to be driven onto a smooth platform at the street level.

At the street level and with platform in the lowered position the dolly can be moved off the elevator longitudinally or laterally into cutout sections of the street floor for loading if desired. With the platform top 11, 12 and 21 at the same level as the floor and the cutout floor configuration fitting that of the dolly, automobiles can be easily driven onto the dolly platform, the dolly platform raised to keep the automobile from rolling and the dolly moved onto the elevator.

The movable section, which consists of all parts supported on longitudinal members 18, is raised and lowered by means of two pantograph jacks 22. The only point of connection of these jacks 22 to the movable section is at pins 23 which are attached to the sides of members 19. The bottom legs 24 of the jack are supported by rollers 25 (FIGURE 8) which are free to roll in track members 26. The two sides of the jack 22 are held at fixed spacing by blocks 27 which are free to rotate. These blocks 27 are threaded to receive steel worms 28 and 29. Shaft 30 turns the worms one of which is right-hand the other left-hand thread. Turning shaft 30 one direction draws the two blocks 27 of a jack 22 together, lifting the movable section at pin 23. Turning the shaft 30 in the opposite direction lowers the movable section. A thrust bearing 31 located on the shaft 30 between the right and left-hand worms assures that the jack 22 remain fixed longitudinally and in turn the movable section of the dolly remains fixed longitudinally. It can be seen in FIGURE 8 that members 18 are confined laterally by supporting members 21 as the movable part of the dolly is raised or lowered.

Shaft 30 is turned by reversible motor 32 and chain and sprocket 33. Motor 32 receives electrical supply from elevator 1 over cable 34. One end of the cable 34 is connected to the elevator electrical system at 35 the other end to a spring driven reel 36 which maintains sufficient tension on cable 34 to eliminate any slack. The motor electrical leads are connected to terminals on the reel 36. By mounting the reel 36 on the movable dolly 9 the cable 34 does not drag but lays out as the dolly 9 moves away from the elevator and picks up cable 34 as it returns. A caster mounted pulley 37 at the reel 36 assures that the cable 34 does not bind and that it feeds properly to and from reel 36 regardless of the direction the dolly moves. A conical connection 38 at the elevator assures that the cable will not be damaged regardless of which of the four direction of travel the dolly 9 takes. Reel 36 is a standard manufactured item of the Appleton Electric Company of Chicago, Illinois, and is called the trade name of "Reelite."

The dolly 9 is supported on four legs 39 affixed to caster mounted carriers 40. These carriers are roller 41 supported from elevator tracks 42. The dolly 9 is moved laterally or longitudinally from a drive pin 54 that fits into socket 44. (Pin 54 is shown in FIGURE 10.)

ELEVATOR

In FIGURES 9 and 10 the principal features of the elevator facilities are shown. The dolly drive mechanism 45 consists of a conveyor housing 46, conveyor chain 47 (FIGURE 4) and Caterpillar drive unit 48. The assembly 45, including the Caterpillar drive 48, is an adaptation of a conveyor under the trade name of "600 Series Chainless Conveyor" and manufactured by the Conveyor Division of the American Monorail Company of Tipp City, Ohio. Their conveyor consists of carriers similar to those shown as 49 in FIGURES 4 and 5 interconnected by rods 47a. In this type of conveyor the chain is maintained centered in its track system by rollers 50 arranged in quadrature around the chain and guided by four angle tracks 51.

The 600 series conveyor is designed to operate in a closed loop, maintaining the pull equal to push on carriers. My system proposes to operate open loop, that is pushing the carriers when the dolly leaves the elevator and pulling the carriers to return the dolly to the elevator, and as a result the 600 series needs certain modifications. The 600 series design consists of carriers, such as 49 in FIGURE 4, with a socket 53 at each end. The carriers are spaced in the system with rods 47a having a ball on each end to fit the carrier sockets. Each carrier has two rollers in each track, whereas mine has only one roller 50 in each track. Where each of their carriers therefore had a total of eight rollers mine has four rollers 50. In my design, FIGURE 4, one end of each rod 47a has been fixed rigid to one end 52 of the carrier 49 in order to eliminate a flexing point at 52. The only flexing point is at the other end of the rod 47a at the ball 53a and socket joint 53 which, being a fixed distance from the rollers 50 associated with the carrier 49 to the left, maintains chain alignment by virtue of the socket being close to the center of rollers 50 of the next carrier 49 to the right. It can be seen that, with the rods, of the 600 series, flexing points are at each end of each carrier 49 and the columnar effect when being pushed would cause a tendency to buckle at the flexing points and place great strain on the track members 51. One set of rollers 50, present on the 600 series, was eliminated on my design to allow complete freedom of traveling around turns such as those shown in the drive assembly 45. However, there is no duty or load on any part of the conveyor chain 47 in the curved portion of the conveyor drive assembly 45, only slack conveyor chain being stored in that portion. Pin 54 is attached to a carrier link 55 of the conveyor chain and serves to drive the dolly by being connected to it through socket 44 shown in FIGURE 7. The top section 56 of the conveyor assembly 45 is straight and houses a Caterpillar drive unit 48. The Caterpillar drive chain lugs, not shown, engage several links ahead of the pin link 55 which may be rigid, without balls and sockets, but must have carrier units properly spaced so that drive lugs of the Caterpillar drive 48 can engage them.

Referring to FIGURES 9 and 10 the conveyor assembly 45 is rotatable on an axis which aligns with the center of the pin 54 when the pin 54 is in such position that the dolly 9 is centered on elevator 1. The conveyor assembly 45 can be rotated to form conveyor track alignments in either of the two lateral or two longitudinal directions. To do this it need travel only three quadrants or 270 degrees. This allows a quadrant or 90 degrees of space for a structure to support the upper end of the fixed shaft 57 on and around which the conveyor assembly 45 turns. The suporting means is shown in dash outline 58. The conveyor assembly 45 rests on a bearing 59 at the top of the fixed shaft 57. Another bearing 60 on the shaft near the bottom maintains the conveyor assembly 45 centered.

In operation, reversible motor 61 starts, electric brake 62 releases, electric clutch 63 engages and conveyor 45 is turned by sprockets 64 and 65 and chain 66 at the proper speed by speed reducer 67. It is stopped at the proper track alignment position by disengaging the clutch 63 and applying brake 62. With the motor still running brake 68 is released, clutch 69 engaged and Caterpillar drive unit 48 is driven by shaft 70 from speed reducer 71 moving the conveyor chain 47, pin 54 and dolly 9 away from the elevator. Note that the push is on the straight section 56 and no load is carried by the slack chain as it is drawn out of the curved part of conveyor assembly 45.

In order for the dolly to be driven into a side storage cell 4 or end storage cell 5 there must be track rails 10 and conveyor track 72 in the cells. Furthermore, the design must permit a true alignment of these tracks with the elevator tracks 42 and the elevator conveyor track system in the direction that it is desired to move the dolly. It has already been shown how the conveyor assembly 45 can be rotated to align its track in any one of four directions. If the system is to be required, as it sometimes will, to load and unload in only two and opposite directions instead of four, the elevator track system can be very simple. Two continuous fixed rails 42 can cross the elevator 1 in the direction desired, shown longitudinally in FIGURE 1. The drive end of conveyor assembly 45 need only turn 180 degrees to align with a fixed continuous conveyor track 73 on the elevator 1 at points 74. At each end of the elevator 1 the three tracks (two support rails 42 and conveyor track 73) must align with the tracks 10 and 72 in the respective storage cells. A method of latching the cell tracks to the elevator tracks will be described later. In the case of only lateral rather than only longitudinal parking, no fixed conveyor track 73 would be required on the elevator since the end of movable part 45 of the conveyor will align with the cell conveyor tracks 72 at points 75.

When the design is such as to permit both lateral and longitudinal parking, four supporting track turntables 76 and two conveyor track turntables 77 are required on the elevator. These are shown in plan in FIGURE 1 and in detail in FIGURES 9 and 10. The conveyor track turntables 77 are required only to open a passage to permit the dolly legs 39 to move across elevator 1 laterally over lateral tracks 78. However, the four track turntables 76 are required to direct the dolly 9 in the direction, laterally or longitudinally, required. The dolly 9 in its normal position on the elevator 1 has the castered track roller carriers 40 centered in the track turntables 76. These turntables 76 need turn only 90 degrees to form a track alignment laterally or longitudinally. The conveyor track turntable 77 need turn only 90 degrees to align the conveyor track for longitudinal movement of the dolly 9 or to locate it in such position as to permit lateral travel of dolly legs 39. In FIGURES 9 and 10 the turntables are shown operable in unison by means of a steel cable 79. This cable is attached to track turntable pulleys 80, 81 and 82 at points 83 and 84 forty-five degrees from the end of their rotation in either direction. Where the two cables pull off from a turntable at slightly different levels such as at pulley 81, two pulleys are mounted vertically on shaft 85, upper pulley 81 and lower pulley 86, and the cable is not continuous around either pulley. Cable 79 is fastened to the lower pulley 86 at point 84 and to the upper pulley at point 83.

*Turntable drive*

The cable system is driven at pulley 82 as shown in detail in FIGURES 11 and 12. The drive assembly consists of motor 87, clutch 88, brake 89, speed reducer 90, lever 91, pin 92, slotted lever 93 and turntable shaft 94. The motor 87 is uni-directional and if run continuously with clutch 88 engaged would cause the entire turntable system to reciprocate between the lateral park and longitudinal park positions. This is because as roller pin 92 on lever 91 moves through one revolution, slotted lever 93 moves through an arc of ninety degrees and returns ninety degrees to its starting position. This arrangement was used to avoid close tolerances in the stop position of lever 91. The position of lever 91 is not critical with this method and can vary several degrees with little or no movement of the turntable system. Where the slot in lever 93 curved, even more tolerance could be obtained. Furthermore when the turntables are in position for dolly movement the levers 91 and 93 are in perpendicular relationship locking the system in position.

TRACK LATCHING MEANS

In heavy loaded freight elevators of the type used in automobile parking perfect alignment of the elevator with different floor levels is difficult to obtain, because of varying amounts of deflection of structural members of the elevator 1 with different loads, yet it is imperative that tracks align perfectly. A system of this type requiring that elevator tracks 76 and 77 align with floor level tracks 10 and 72 requires that some means be provided for aligning and latching in place these track sections after the elevator has reached its assigned floor level.

A means of accomplishing this is shown in FIGURE 9 and in more detail in FIGURES 11, 12, 13, 14, 15 and 16. This design assumes that the elevator turntable track sections 76 and 77 can be precisely positioned by electrical controls and latched into place to track sections on the elevator proper by solenoid operated pins extending into apertured clip angles 95a. Alignment with storage cell tracks 10 and 72 is obtained by mounting these storage cell tracks 10 and 72 on supports, not shown, that permit some longitudinal movement. These are readily available manufactured items usually furnished to support members subject to thermal expansion. The storage cell tracks 10 and 72 are equipped with rollers 96 which are held against cam 97 by springs 98. The ends of the storage cell tracks 10 and 72 are mounted on special supports 99 shown in isometric detail on FIGURE 13. This support permits some vertical, lateral and longitudinal movement, at the same time does not allow tipping. Vertical movement is accomplished against spring 100 tension or compression by an inverted U-shaped member 101 in sliding relationship with member 102. Lateral movement is permitted but confined to a horizontal direction by H-shaped member 103 arranged in a sliding relationship with C-shaped member 104 which is in fixed attachment to member 101. Any lateral track movement must overcome springs 105.

The latching operation is driven by the turntable motor 87 and can be described as follows: Brake 106 is released, clutch 107 engaged turning through speed reducer 108, sprocket 109 and sprocket 110 over connecting chain 111. Sprocket 112 is on the same shaft 113 as sprocket 110. A chain 114 with attachment 115 on the elevator 1 parallels a chain 116 in the storage cell at the floor level. This elevator latch chain 114 loops around idler sprocket 117 and is driven by sprocket 112. Roller attachments 118 are in such space arrangement on chain 114 that when attachment 115 on chain 114 continues to move around its loop in successive passes it contacts rollers 118 on chain 116 and will alternately drive sprocket 119 one-quarter turn then three-quarter turn in clockwise direction. In FIGURE 11 the turntable tracks 76 and 77 have been turned towards longitudinal alignment with end storage cell tracks 10 and 72. Clutch 88 has been disengaged and brake 89 applied. With the turntable tracks 76 and 77 in alignment with elevator fixed tracks 42 and 74 they are latched in place on the elevator with solenoid pins 95 as shown in FIGURE 12. Elevator latch chain 114 is being driven by motor 87 by the release of brake 106 and engagement of clutch 107 and chain attachment 115 has come into contact with a roller attachment 118 on storage cell latch chain 116. With sprocket 112 turning counter-clockwise, one pass of chain attachment 115 will turn sprocket 119 three-quarters of a turn clockwise. This performs the latching operation. The next pass of the attachment 115 turns sprocket 119 one-quarter of a turn and performs the unlatching operation. Roller pin 120 traveling in the slot of lever 121 will move lever 121 turning shaft 122 ninety degrees. It will be noted that this pin-slot actuation is similar to that described for turntable operation and permits a considerable amount of tolerance in the stopping position of roller pin 120. Furthermore the perpendicular relationship of the radius at the pin 120 with slot in lever 121 locks the mechanism in latched or unlatched position. Lever 121 by means of a roller pin 123 attached to the bottom of bar 124 and traveling in another slot 125 of lever 121 will move bar 124 in a straight line longitudinally because of guides 126. Bar 124 turns all remaining latch shafts 122 on all sides of the elevator 1. Latch shaft levers 127 are turned ninety degrees by roller pins (similar to 123 in FIGURE 12) on the bar 124 traveling in slots of lever 127. Latch shaft levers 127 on the other three sides of the elevator are operated simultaneously by bars 124 and interconnecting cable 128 attached to each end of bars 124.

Latch

Each latch shaft 122 performs the latching operation which can be described from the design shown in FIGURES 14, 15 and 16. Each latch aligns the elevator tracks 76 and 77 vertically, laterally and longitudinally with the storage cell tracks 10 and 72 and locks the connection in place. Latch shafts 122 have a flexible coupling 129 (FIGURE 12) that allows the slight lateral and longitudinal movement of storage cell tracks 10 and 72 permitted by support 99 and necessary for alignment. Vertical alignment is accomplished by slippage of the shaft 122 in bushing 130.

Latch member 131 is a short section of channel supported at the end of elevator turntable tracks 76 and 77 by a Z-shaped bar strap 132. This member 131 straddles latch key 133 as the elevator track 76 moves into the latch between shoes 134 when the key 131 is in open position as shown in FIGURE 15(a). Key 131 is rotatable by the shaft 122, on the end of which it is mounted. The shaft passes through a bushing 130 and the key 131 is within a U-shaped guide shoe 134 held at top and bottom by Z-shaped bar straps 135 fastened to the ends of the storage cell tracks 10 and 72. After the movable latch member 131 has moved into guide shoe 134 over latch key 133, the latch key 133 is turned ninety degrees by shaft 122 aligning the tracks laterally and locking the connection in place as shown in FIGURE 15(b). Latch channel member 131 has sections of its flanges cut out so that as key 133 is turned against the remaining parts of these flanges as shown in FIGURE 15(b) this aligning and locking operation is accomplished. The tracks are aligned vertically by the latch member 131 as its beveled edges 136 enter guide shoe 134, lifting or lowering the storage cell track 10 and 72 into alignment. Longitudinal alignment, the closing of gap 137, is accomplished by rotation of cam 97, which lessens its radius as latch shaft 122 turns allowing roller 96 attached to the cell track to be pushed by spring 98, thus closing gap 137. Since in the unlatching operation spring 98 must be compressed, spring 138 attached to bar 124 assists in overcoming some of the burdens from the unlatching operation. However, all latching operations are performed with no weight on the storage cell tracks. The dolly wheels will always be exactly centered on the turntables during latching operations.

Since all turntable track latch members 131 move into track guide members 134, and reverse direction to move out, all latches at these points are fitted with closed end shoes 134 as shown in FIGURE 16. However, one latch that aligns and locks conveyor drive assembly 45 track to the conveyor track 72 in a lateral storage cell must have latch guide shoe 134 designed as shown by the dash lines 139 so that latch member 131 can pass through the guide shoe 134. Since the conveyor drive assembly 45 can turn only 270 degrees because of supporting structure 58 as shown on FIGURE 9, then must reverse, it can be seen that latch 140 can be fitted with the guide shoe 134 shown in FIGURE 16 and latch 141 must use latch shoe 139.

PARKING GARAGE ARRANGEMENTS

Some arrangements of rectangular parking garage applications of the system are shown in FIGURE 17 through FIGURE 23. FIGURE 17 shows a garage three spaces long and two wide. FIGURE 17(a) is a typical upper floor arrangement. The elevators in this system must store automobiles from one end and one side. FIGURE 17(b) shows possible street floor traffic paths. In this figure automobiles are shown being driven directly onto the elevators. It must be remembered, however, that the dollies can be moved out to the ends or sides of the elevators and loaded.

The parking garage shown in FIGURE 17 has an occupancy rate of 4 parking spaces per floor/6 total spaces per floor=66.7 percent, and the maximum number of floor levels can be, assuming 100 spaces can be served by each elevator, 2 elevators ×100/4 spaces per floor =50 stories.

FIGURES 18 and 19 are simple extensions of FIGURE 17. The system shown in FIGURE 18 has one elevator handling three storage spaces and the other two elevators each handling two spaces, the occupancy rate is 70 percent and the maximum number of floor levels is 43.

FIGURE 19 has two elevators that can transfer on three sides and two that can transfer on two sides for an improved occupancy rate of 71.4% and a maximum permissible height of 40 stories.

FIGURE 20 with the configuration shown has an occupancy rate of 74.3% and a maximum permissible height of 34 stories.

FIGURE 21 has the same parking capacity occupancy and stories as FIGURE 18 but is in different configuration.

FIGURE 22 shows a ten elevator garage with parking capacity of 28 spaces per floor which has an occupancy rate of 73.7% and a maximum permissible height of 35 stories.

It will be remembered that these occupancy rates are the ratios of spaces excluding elevators to spaces including elevators. The occupancy of this system excluding the space occupied by elevator shafts that are very little larger than the size of automobiles is always 100 percent. Furthermore, the occupancy rates are reasonably close to what they would be were they calculated as the ratio of square feet actually occupied by stored automobiles to the total floor space, since this system can park cars in very little more space than the actual car size. This also true of the elevator size, it being very little larger than an automobile.

FIGURE 23 illustrates the use of this design to park automobiles adjacent to the rooms or offices in a motel, office building or apartment. Each room or office can have a parking space associated with and available to it. For example, assume that this is a multistory motel. Cars can be driven onto elevators 142 or 143 and registration can be at a window 144. The driver will be directed to an elevator, which may be the one he is on or another, or an attendant may take his car up and he might prefer to use passenger elevator 145. His key would fit his room and the storage cell occupied by his car.

MOVING CELL ARRANGEMENT

Where the additional equipment can be justified even higher occupancy rates than those described can be obtained with the system design shown in schematic in FIGURES 24, 25, 26 and 27. Storage cells 146 can be moved as a unit, one position to the left when space 147 is not occupied or one position to the right when space 148 is not occupied. Under peak load conditions when automobiles are stored in cells 147 and 148 the system shown can be operated up to 87 percent occupancy. This is probably the optimum rate of occupancy since most of the elevators are handling 7 to 8 cars per floor under this system limiting the number of floors to twelve or fourteen under the 100 cars per elevator limitation.

The minimum system would consist of one B elevator unit with its eight storage spaces, sandwiched between two A elevator two storage space units. The A elevators being two-directional will be much simpler in design since no track turntables will be required. The occupancy rate of this minimum system is 80 percent. As the number of B elevator units is increased the occupancy rate increases up to a maximum of approximately 87 percent.

The system shown in FIGURE 24 has an occupancy rate of 85.7 percent and will be approximately the depth of a typical building site and can be arranged as shown in FIGURE 25(b). The normal operating procedure would be to use spaces 147 and 148 only for peaking purposes. The system can be loaded to 89% of its capacity (89% of the overall 87% occupancy) without using the end cells. When cells 147 and 148 are used and it is necessary to park or unpark cars associated with the C storage cells, elevators A would shuttle to the floor level and remove the vehicle from storage cell 147 or 148 as the case may be, permitting a space C to be shifted to the right or left necessary to the parking from or unparking to a B elevator.

FIGURE 26 shows the ground floor traffic plan of a double ended garage with an assembly of three systems just described. FIGURES 25(b) and 27 show how the ground floor traffic plan could be arranged for a single ended garage.

FIGURES 28 and 29 illustrate the design features of this shuttle system employing two 8-space units sandwiched between two 2-space units.

The end storage cells 147 and 148 have vehicle supporting fingers 7 fastened to beams 149 which are permanently attached to building columns 150. Dolly track rails 70 and conveyor track 71 are shown and are the same as for the systems previously described. The storage cell fingers 151 in each cell between the end cells 147 and 148 are connected by angle beams 152 and supported by vertical suspension members 153 from a movable platform 154. Two top beams 155 serve as movable tracks over fixed rollers 156 attached to building structural beams 157. The bottom of fingers 151 are at an elevation just sufficient to pass over the top of fingers 7 in the end cells 147 and 148 and may do so when there is no vehicle stored in end cells 147 and 148 on storage fingers 7. In order that the same type elevator dolly 9 may be used throughout the system track rails 158 and conveyor track 159 in the interior cells must be at a higher elevation than those in the end cells 147 and 148 and bear the same space relationship to the cell fingers as those in end cells. Elevators 1 in the end cells 147 and 148 therefore will stop at a slightly lower level than those serving the interior cells.

Movement of platform 154 is accomplished by mounting a reversible double end motor 160 above one of the storage cells in the center row of the system. This motor is equipped with clutch 161, brake 162 and speed reducer 163 which is connected to shaft 164 with sprocket 165 over movable platform 154. Chain 166 is looped around drive sprocket 165, idler sprocket 167 and over rollers 168. The rollers 168 permit chain 166 travel over building structural beams 169. Chain 166 is permanently fastened to the platform 154 at cross member 170. Members 171 and struts 172 are structural members designed to properly distribute the forces at the platform 154. By means of the motor clutches 161 and brakes 162 either movable platform 154 can be driven in either direction by motor 160.

It will be particularly noted that the storage cell tracks 158 and conveyor tracks 159 remain fixed and only the platforms 151 are moved. Therefore, the elevator and the latching system are unaffected by this movable cell adaptation.

From the foregoing it will be apparent that the present invention provides a highly useful mechanical storage system for parking automobiles and the like, wherein the unusable storage space is reduced to a minimum. The mechanical facilities are located on an elevator, although the automobiles are actually stored in storage cells adjacent the elevator at each floor level, such that a single set of facilities for a complete parking system are concentrated on the elevator to provide a minimum cost. The time required to park and unpark an automobile at an elevated level is minimized with the present system; the system provides efficient loading and unloading of vehicles at the street level, and the system is flexible to fit substantially any configuration of land available.

Changes may be made in the combination and arrangement of parts or elements as heretofore set forth in the specification and shown in the drawings, it being understood that changes may be made in the embodiments disclosed without departing from the spirit and scope of the invention as defined in the following claims.

I claim:
1. A system for storing automobiles at an elevated level, comprising:
   means forming an elevator shaft extending vertically through the elevated level;
   an elevator in the shaft having track means thereon;
   a dolly movably supported on the track means on the elevator having spaced fingers thereon arranged to support an automobile;
   an automobile storage cell at the elevated level adjacent the elevator shaft having track means therein arranged to mate with the track means on the elevator and having a plurality of spaced fingers therein above the track means to support an automobile, said fingers in the automobile storage cell being arranged to mesh with the fingers on the dolly in one position of the dolly in the automobile storage cell;
   extensible drive means mounted on the elevator and connected to the dolly for moving the dolly on the track means completely from the elevator into the automobile storage cell to said one position and back onto the elevator;
   means on the dolly for raising and lowering the fingers on the dolly through the fingers in the automobile storage cell when the dolly is positioned in said one position in the automobile storage cell for transferring an automobile from the dolly to the automobile storage cell or vice versa;
   wherein said means for moving the dolly into and out of the automobile storage cell comprises:
   an elongated housing on the elevator having a curved storage section and a straight delivery section directed toward the automobile storage cell;
   a plurality of carriers in the housing interconnected by rods providing an elongated chain;
   guide rollers on each carrier of said chain;
   guides in the delivery section of said housing cooperating with said rollers to prevent the chain from buckling when pushed or pulled;
   means connecting the chain to the dolly;
   means for moving the chain lengthwise in and out of said housing to move the dolly; and
   a guide in the automobile storage cell positioned to receive the chain when the dolly is in the automobile storage cell and cooperate with the rollers on the chain carriers to prevent the chain from buckling.

2. A system as defined in claim 1 characterized further to include:
   a second automobile storage cell at the elevated level adjacent the elevator shaft spaced horizontally from the first-mentioned automobile storage cell;
   track means in the second automobile storage cell arranged to mate with the track means on the elevator;
   fingers in the second automobile storage cell arranged to mesh with the fingers on the dolly when the dolly is moved into the second automobile storage cell;
   means rotatably supporting said housing on the elevator for directing the delivery section thereof toward the first-mentioned automobile storage cell and, alternately, toward the second automobile storage cell; and
   a guide in the second automobile storage cell for receiving and guiding said chain upon movement of the dolly into and out of the second automobile storage cell.

3. In a system for storing automobiles at an elevated level, comprising:
   means forming an elevator shaft extending through the elevated level;
   an elevator in the shaft;

an automobile storage cell at the elevated level opening into one side of the elevator shaft;

a track in the automobile storage cell terminating adjacent the elevator shaft;

a turntable on the elevator;

a track section on the turntable of a length to protrude from the elevator shaft in one position of the turntable and mate with the adjacent end of the track in the automobile storage cell;

a vertical shaft journaled in the automobile storage cell having one-half of a latch thereon;

a stop carried by the track in the automobile storage cell adjacent the latch portion carried by said shaft;

one-half of a latch carried by the track section on the turntable in a position to contact said stop and mate with the latch portion carried by said shaft when the turntable is turned to mate said tracks; and means for turning said shaft to interlock the latch portions when said tracks are in mating relation.

4. A system as defined in claim 3 wherein said means for turning said shaft comprises:

a lever secured to the shaft at right angles to the shaft and having a slot therein;

a sprocket positioned parallel with the lever and having a pin thereon slidingly extending into said slot;

a chain extending around said sprocket; and means on the elevator for engaging said chain and turning said sprocket when said tracks are in mating relation.

References Cited by the Examiner

UNITED STATES PATENTS

| | | | |
|---|---|---|---|
| 1,261,633 | 4/1918 | Shuford | 214—512 X |
| 1,541,457 | 6/1925 | Winn | 214—38 |
| 1,683,492 | 9/1928 | Ruth | 214—16.1 |
| 2,707,054 | 4/1955 | Alimanestiano | 214—16.1 |
| 2,712,875 | 7/1955 | Leopold | 214—16.1 |
| 2,752,051 | 6/1956 | Strahm et al. | 214—16.1 |
| 2,817,447 | 12/1957 | Bianca | 214—16.1 |
| 2,818,189 | 12/1957 | Schreck | 214—514 |
| 2,849,126 | 8/1958 | Kerekes | 214—16.1 |
| 2,876,913 | 3/1959 | Roth et al. | 214—16.1 |
| 2,936,083 | 5/1960 | Dahlman | 214—16.1 |
| 3,161,303 | 12/1964 | Burrows | 214—16.1 |

FOREIGN PATENTS

| | | |
|---|---|---|
| 887,823 | 1/1962 | Great Britain. |

GERALD M. FORLENZA, *Primary Examiner*.

R. B. JOHNSON, *Assistant Examiner*.